United States Patent
Kim et al.

(10) Patent No.: US 10,122,002 B2
(45) Date of Patent: Nov. 6, 2018

(54) THIN AND FLEXIBLE SOLID ELECTROLYTE FOR LITHIUM-ION BATTERIES

(71) Applicant: GM GLOBAL TECHNOLOGY OPERATIONS LLC, Detroit, MI (US)

(72) Inventors: Jung Hyun Kim, Troy, MI (US); Bob R. Powell, Jr., Birmingham, MI (US); Meng Jiang, Rochester Hills, MI (US); Peng Lu, Troy, MI (US); Xingcheng Xiao, Troy, MI (US); Nicholas P. W. Pieczonka, Windsor (CA)

(73) Assignee: GM Global Technology Operations LLC, Detroit, MI (US)

( * ) Notice: Subject to any disclaimer, the term of this patent is extended or adjusted under 35 U.S.C. 154(b) by 511 days.

(21) Appl. No.: 14/601,355

(22) Filed: Jan. 21, 2015

(65) Prior Publication Data

US 2016/0211498 A1    Jul. 21, 2016

(51) Int. Cl.
*H01M 2/16*      (2006.01)
*H01M 10/0525*   (2010.01)
*H01M 4/13*      (2010.01)
*H01M 10/0562*   (2010.01)
(Continued)

(52) U.S. Cl.
CPC ....... *H01M 2/1686* (2013.01); *H01M 2/1646* (2013.01); *H01M 4/13* (2013.01);
(Continued)

(58) Field of Classification Search
CPC .... H01M 2/1686; H01M 2/1646; H01M 4/13; H01M 4/587; H01M 4/505; H01M 4/525;
(Continued)

(56) References Cited

U.S. PATENT DOCUMENTS

| 3,506,491 A | 4/1970 | Buzzelli et al. |
| 3,506,492 A | 4/1970 | Buzzelli et al. |

(Continued)

FOREIGN PATENT DOCUMENTS

| CN | 104051688 A | 9/2014 |
| JP | 2230662 A | 9/1990 |
| JP | 1131534 A | 2/1999 |

OTHER PUBLICATIONS

C.A. Angell, et al.; Variations on the salt-polymer electrolyte theme for flexible solid electrolytes; Solid State Ionics 86-88 (1996); pp. 17-28; Elsevier Science.

*Primary Examiner* — Jimmy Vo
(74) *Attorney, Agent, or Firm* — Reising Ethington P.C.

(57) ABSTRACT

A lithium-ion conducting, solid electrolyte is deposited on a thin, flexible, porous alumina membrane which is placed between co-extensive facing side surfaces of a porous, lithium-accepting, negative electrode and a positive electrode formed of a porous layer of particles of a compound of lithium, a transition metal element, and optionally, another metal element. A liquid electrolyte formed, for example, of $LiPF_6$ dissolved in an organic solvent, infiltrates the electrode materials of the two porous electrodes for transport of lithium ions during cell operation. But the solid electrolyte permits the passage of only lithium ions, and the negative electrode is protected from damage by transition metal ions or other chemical species produced in the positive electrode of the lithium-ion cell.

15 Claims, 3 Drawing Sheets

(51) Int. Cl.
*H01M 10/0565* (2010.01)
*H01M 10/056* (2010.01)
*H01M 10/0585* (2010.01)
*H01M 4/525* (2010.01)
*H01M 4/505* (2010.01)
*H01M 4/02* (2006.01)
*H01M 4/587* (2010.01)

(52) U.S. Cl.
CPC ..... *H01M 10/056* (2013.01); *H01M 10/0525* (2013.01); *H01M 10/0562* (2013.01); *H01M 10/0565* (2013.01); *H01M 4/505* (2013.01); *H01M 4/525* (2013.01); *H01M 4/587* (2013.01); *H01M 10/0585* (2013.01); *H01M 2004/021* (2013.01); *H01M 2004/027* (2013.01); *H01M 2004/028* (2013.01); *H01M 2300/0068* (2013.01); *H01M 2300/0071* (2013.01); *H01M 2300/0082* (2013.01)

(58) Field of Classification Search
CPC ........... H01M 10/056; H01M 10/0525; H01M 10/0562; H01M 10/0565; H01M 10/0585; H01M 2004/021; H01M 2004/027; H01M 2004/028; H01M 2300/0071; H01M 2300/0082; H01M 2300/0068
See application file for complete search history.

(56) References Cited

U.S. PATENT DOCUMENTS

| | | | |
|---|---|---|---|
| 3,994,747 A | 11/1976 | Greatbatch et al. | |
| 4,517,265 A | 5/1985 | Belanger et al. | |
| 6,022,642 A | 2/2000 | Tsukamoto et al. | |
| 6,103,416 A * | 8/2000 | Bauerlein | H01M 10/05 29/623.3 |
| 6,183,914 B1 | 2/2001 | Yao et al. | |
| 6,544,690 B1 | 4/2003 | Harrup et al. | |
| 6,645,675 B1 * | 11/2003 | Munshi | H01B 1/122 252/62.2 |
| 8,216,712 B1 * | 7/2012 | Ramasubramanian | H01M 2/1646 429/144 |
| 8,492,021 B2 | 7/2013 | Kaun | |
| 2002/0150823 A1 | 10/2002 | Breitkopf et al. | |
| 2005/0287425 A1 * | 12/2005 | Shi | H01M 6/181 429/145 |
| 2011/0104553 A1 * | 5/2011 | Pol | B82Y 30/00 429/156 |
| 2012/0115048 A1 * | 5/2012 | Roev | B82Y 30/00 429/405 |
| 2013/0034770 A1 * | 2/2013 | Kaun | H01M 2/145 429/149 |

* cited by examiner

THIN AND FLEXIBLE SOLID ELECTROLYTE FOR LITHIUM-ION BATTERIES

TECHNICAL FIELD

Useful and efficient lithium-ion batteries are formed by combining a negative electrode comprising particles of a lithium-accepting material, a positive electrode comprising particles of lithium and a transition metal, and a non-aqueous liquid electrolyte for transporting lithium ions between the electrodes during discharge and re-charging of the electrochemical cell. In this invention, a solid electrolyte, carried on a thin, flexible membrane, and covering pores extending through the membrane, is used to permit transport of lithium ions between the electrodes while blocking negative electrode-damaging ions, arising from the positive electrode, from accessing the negative electrode.

BACKGROUND OF THE INVENTION

Assemblies of lithium-ion battery cells are finding increasing applications in providing electric power in automotive vehicles and in computers, lamps, and in many other non-automotive, consumer and aerospace applications.

Each lithium-ion cell of the battery is capable of providing an electrical potential of about three to four volts and a direct electrical current, based on the composition and mass of the electrode materials in the cell. The cell is capable of being discharged and charged over many cycles. A battery is assembled for an application by combining a suitable number of individual cells in a combination of parallel and series electrical connections to satisfy voltage and current requirements, for example, for a specified electric motor used in driving an automotive vehicle. In a lithium-ion battery application for an electrically powered vehicle, the assembled battery may, for example, comprise up to three hundred individually packaged cells that are electrically interconnected to provide forty to four hundred volts and sufficient electrical power to an electrical traction motor to drive a vehicle. The direct current produced by the battery may be converted into an alternating current for more efficient motor operation.

In these automotive applications, each lithium-ion cell typically comprises a negative electrode layer (anode, during cell discharge), a positive electrode layer (cathode, during cell discharge), a thin porous separator layer interposed in face-to-face contact between parallel, facing electrode layers, and a liquid, lithium ion-containing, electrolyte solution filling the pores of the separator and contacting the facing surfaces of the electrode layers for transport of lithium ions between the electrodes during repeated cell discharging and charging cycles. Each electrode is prepared to contain a layer of a porous electrode material, typically deposited as a polymer resin-coated mixture of particles on a thin layer of a compatible metallic current collector.

For example, the negative electrode material has been formed by spreading a thin layer of graphite particles or lithium-accepting alloy or oxide and a suitable polymeric binder onto one or both sides of a thin foil of copper (or aluminum, for high voltage negative electrodes) which serves as the current collector for the negative electrode. The positive electrode often comprises a thin layer of resin-bonded, porous, particulate lithium-metal-oxide composition spread on and bonded to a thin foil of aluminum, which serves as the current collector for the positive electrode. The positive and negative electrodes may be formed on conductive metal current collector sheets of a suitable area and shape, and cut (if necessary), folded, rolled, or otherwise shaped for assembly into lithium-ion cell containers with suitable porous separators and a liquid electrolyte.

There remains a need to improve the performance of certain lithium-ion cells to reduce capacity-fading of the cells due to unwanted consumption of lithium ions in the cells.

SUMMARY OF THE INVENTION

An example of very useful lithium ion cell is characterized by a relatively thin, rectangular negative electrode comprising a porous layer of graphite particles bonded to at least one side of a copper current collector foil and a like-shaped positive electrode comprising a porous layer of, for example, lithium-nickel-manganese-cobalt oxide particles bonded to at least one side of an aluminum current collector foil. Other lithium accepting (or lithium intercalatable) materials may be used in the negative electrode and other lithium and transition metal compounds may used in the positive electrode.

The porous electrode material layers are infiltrated with a non-aqueous solution of a lithium-ion containing electrolyte and the electrode faces electrically isolated with a thin porous separator member, squeezed between the electrode faces. An example of electrolyte is a 1 M solution of $LiPF_6$ salt in a mixture of ethylene carbonate and ethyl methyl carbonate. During charging of each such cell, lithium ions flow from the positive lithium-containing electrode material through the electrolyte solution and are either intercalated as lithium atoms into the graphitic electrode structure or converted to lithiated alloys (e.g., $Li_xSi$). And during cell discharge, the lithium releases electrons to an external circuit and lithium ions (from the porous negative electrode material) re-enter the electrolyte in which they flow through the porous separator back into the lithium-nickel-cobalt-manganese oxide compound.

Obviously, the compositions of Li—Ni—Co—Mn—O positive electrode materials are continually changing, with the in-flow and out-flow of lithium during discharging and charging of the cell. We have observed that transition metal ions (such as, for example, manganese ions) are also leaving the positive electrode material and adversely affecting the graphitic negative electrode material (or other negative electrode material) and/or the solid-electrolyte interface (SEI) formed on the particulate negative electrode material. We have observed that virtually any transition metal element in positive electrode materials (typically lithium-transition metal compounds) will eventually dissolve and their ions migrate through a liquid electrolyte to the negative electrodes.

Accordingly, we are replacing the porous separator with a porous membrane, carrying a solid electrolyte that conducts lithium ions, which serves to prevent transition metal ions (and other unwanted organic/inorganic species), from reaching the negative electrode. Much of the liquid electrolyte content of the cell is retained, but the new porous membrane, with its solid electrolyte coating, is interposed coextensively between the faces of the opposing positive and negative electrodes.

In accordance with embodiments of this invention, a thin, flexible ceramic membrane, having closely spaced, one dimensional transverse pores extending between the faces of the membrane, is employed. The membrane may be formed of anodized alumina or of a lithium-conducting ceramic, glass, polymer, or other suitable material composition, as specified below in this specification. Such anodized alumina membranes are available and preferred.

The thickness of the alumina, or other lithium-conducting membrane material, is suitably in the range of about ten nanometers to about one millimeter. Suitably, the pore diameters are in the range of about one nanometer to fifty micrometers and the area of the pore openings is about twenty to ninety five percent of the superficial area (including the pores openings) of each major face of the membrane.

The pores extending through the alumina membrane are covered or filled with a suitable solid electrolyte for the transport of lithium ions from one side of the membrane to the other. There are many such pores per unit of surface area of the alumina membrane so that a desired flow rate of lithium ions through the thin layer of solid electrolyte is attained in the operation of the cell. When the solid electrolyte-filled alumina membrane is interposed between the faces of the opposing electrodes, transport of transition metal ions and other SEI-damaging species are blocked. But a suitable flow of lithium ions is retained for efficient and continued operation of the lithium-ion cell.

Suitable solid electrolyte materials include lithium-containing oxides, lithium-containing ceramic or glass-like materials, and lithium-containing sulfides. Examples of such lithium-containing materials are presented below in this specification. Also, a suitable solid electrolyte material by be formed using a suitable polymer as a matrix and filling the polymer with one or more lithium salts. Again, examples of these filled polymers are disclosed below in this specification.

One or more of these solid electrolyte materials may be applied as a thin coating over a surface of the membrane, covering the surface and the pore openings. Alternatively, the solid electrolyte materials may be applied so as to cover the face of the membrane and to partly fill the pores. Still further, the solid electrolyte materials may be applied to partly or wholly fill the pores. Coating or pore-impregnating practices include screen printing, dip coating, tape casting, spin coating, and physical vapor deposition. These processes are further described in this specification.

Other objects and advantages of the invention will be understood from the following illustrations of practices of the invention.

BRIEF DESCRIPTION OF THE DRAWINGS

FIGS. 2(a)-2(e) are enlarged, schematic, somewhat idealized, cross-sectional illustrations of a porous alumina membrane with different patterns of pore-covering or pore-filling with a solid electrolyte material. In FIG. 2(a), the solid electrolyte is applied on one surface of the alumina membrane, covering pore openings, but not filling into them. In FIG. 2(b), the solid electrolyte just fills pore openings at one face of the membrane. In FIG. 2(c), the solid electrolyte has been applied so as to cover one surface of the membrane and to fill the pore openings at that surface. In FIG. 2(d), the solid electrolyte has been applied within the pore openings, but not extending to the surfaces of the membrane. And in FIG. 2(e), the solid electrolyte has been applied to substantially fill each pore in the alumina membrane.

DESCRIPTION OF PREFERRED EMBODIMENTS

An illustrative lithium-ion cell will be described, comprising a solid electrolyte coated, porous membrane member employed to protect a negative electrode used in combination with a positive electrode.

Figure 1:
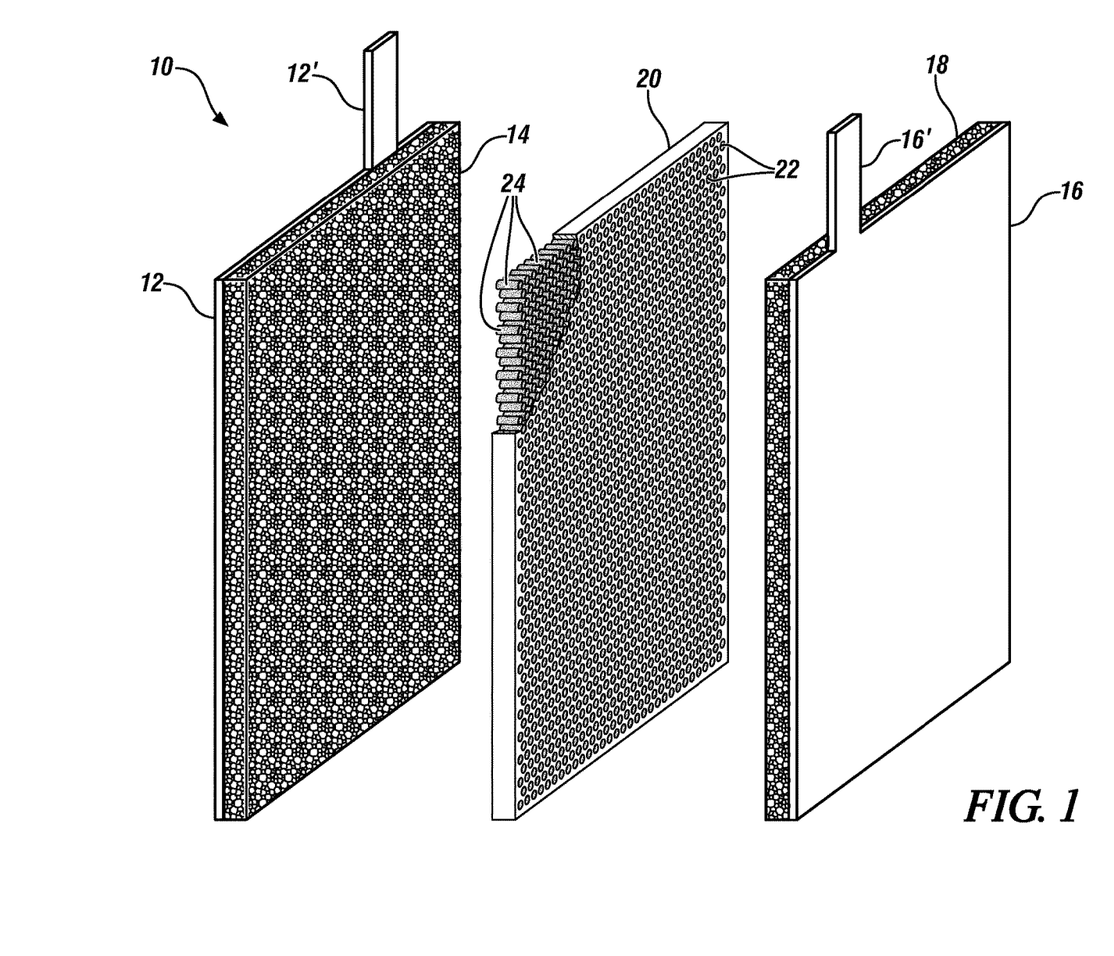
FIG. 1 is an oblique view of an assembly of a negative electrode and a positive electrode separated by a thin, flexible, porous alumina membrane in which the pores of the alumina membrane are filled with particles of a solid electrolyte material.

FIG. 1 is an enlarged schematic illustration of a spaced-apart assembly 10 of three solid members of a lithium-ion electrochemical cell. The three solid members are spaced apart in this illustration to better show their structure. This FIG. 1 illustration does not include a non-aqueous liquid electrolyte solution, which is present and whose composition and function will be described in more detail below in this specification.

In FIG. 1, a negative electrode comprises a relatively thin, electrically conductive, metal foil current collector 12. In many lithium-ion cells, the negative electrode current collector 12 is suitably formed of a thin layer of copper, aluminum, or stainless steel. By way of example only, the thickness of the metal foil current collector is often suitably in the range of about five to twenty-five micrometers. The current collector 12 has a desired two-dimensional plane-view shape for assembly with other solid members of a cell. Current collector 12 is illustrated as a rectangle over its principal surface, and further provided with a connector tab 12' for connection with other electrodes in a grouping of lithium-ion cells to provide a desired electrical potential or electrical current flow.

Deposited on the negative electrode current collector 12 is a thin, resin-bonded porous layer of graphite (or graphite mixed with silicon) or other suitable lithium-accepting alloy or lithium accepting compound negative electrode material 14. Examples of suitable lithium-accepting alloys include mixtures of tin and/or silicon, often mixed with one or more of $SiO_2$, Cr, Mn, Fe, Co, Ni and Cu. (In these examples, any transition metal is an intended part of the negative electrode material.) Examples of suitable lithium-accepting oxides include $TiO_2$ and $Li_4Ti_5O_{12}$.

As illustrated in FIG. 1, the layer of negative electrode material 14 is typically co-extensive in shape and area with the main surface of its current collector 12. The electrode material has sufficient porosity to be infiltrated by a non-aqueous liquid, lithium ion-containing electrolyte. The thickness of the rectangular layer of negative electrode material may, for example, be up to about two hundred micrometers or more so as to provide a desired current and power capacity for the negative electrode. One large face of the layer of negative electrode material 14 is bonded to a major face of current collector 12 and the other large face of the negative electrode material layer 14 faces outwardly from its current collector 12.

A positive electrode is shown, comprising a positive current collector foil 16 (often formed of aluminum or stainless steel) and a coextensive, overlying, porous deposit of positive electrode material 18. Positive current collector foil 16 also has a connector tab 16' for electrical connection with other electrodes in other cells that may be packaged together in the assembly of a lithium-ion battery. The positive current collector foil 16 and its coating of porous positive electrode material 18 are typically formed in a size and shape that are complementary to the dimensions and the electrochemical properties of an associated negative electrode. In practices of this invention, the positive electrode material comprises a porous layer of bonded particles of a lithium-transition metal(s)-oxide composition.

Examples of positive electrode compositions employed in practices of this invention include transition metal element-containing and lithium-containing compounds. For example, the positive electrode may comprise a porous layer of particles of an oxide, phosphate, sulfate, sulfide, or fluoride compound that comprises lithium, a transition metal element, and at least one other element. For example, suitable lithium and transition metal element containing oxides include $LiNi_{0.5}Mn_{1.5}O_4$ having a spinel-type, ionic crystal structure, $Li_{1+x}Ni_yCo_zMn_{1-x-y-z}O_2$, and $LiNi_{1-x}M_xO_2$ ($0 \leq x \leq 0.5$, M=Al, Ti, Cr, Mn, Fe, Co, Cu, Zn, Mg, and mixtures thereof). Commercial or near-commercial Li—Ni—Co—Mn—$O_2$ materials have Ni—Co—Mn ratios, for example, of 1-1-1, ⅓-⅓-⅓, 5-3-2, 6-2-2, 8-1-1, 9-½-½, and the like. These lithium and transition metal-containing oxide materials provide good electrochemical properties in combination with a graphite, alloy, or oxide-containing anode in the lithium-ion cell. But transition metal ions (e.g., Mn, Co, Ni) may be produced (as well as other harmful substances), which may be separated from the electrode material and transported through the liquid electrolyte to reach and damage the negative electrode material or its SEI coating through which lithium ions are transported.

In the illustration of FIG. 1, the two electrodes are alike in their shapes (but they do not have to be identical), and assembled in a lithium-ion cell with the major outer surface of the negative electrode material 14 facing the major outer surface of the positive electrode material 18. The thicknesses of the rectangular positive current collector foil 16 and the rectangular layer of positive electrode material 18 are typically determined to complement the negative electrode material 14 in producing the intended electrochemical capacity of the lithium-ion cell. By way of illustrative example, the thicknesses of current collector foils are typically in the range of about 5 to 25 micrometers. And, for example, the thicknesses of the electrode materials are often up to about 200 micrometers. Again, in accordance with practices of this invention, the positive electrode material (or cathode during cell discharge) is typically bonded (e.g., resin bonded) as a porous electrode material on a metallic current collector foil substrate. The dimensions and shapes of electrode materials are given as examples. The salient point of this invention is not the shapes or sizes of the electrodes, but rather that the disclosed solid electrolyte separator design protects electrodes from being damaged by materials from the opposing electrodes, e.g., transition metal ions from the positive electrode or organic electrolyte decomposition species.

The opposing surfaces of negative electrode material 14 and positive electrode material 18 are separated in the assembly of the cell using a thin, flexible porous ceramic membrane layer 20. Ceramic membrane layer 20 is formed with many holes or pores 22 that extend between the major surfaces of the ceramic membrane layer. The openings of the pores 22 represent a major portion (e.g. 20% to about 95%) of the area of each surface of the membrane 20. In the embodiment illustrated in FIG. 1, each of the pores 22 is filled with plugs of solid electrolyte material 24. Thus, the solid electrolyte plug 24-filled, porous alumina or Li-conducting solid membrane 20 is interposed, like a separator, between the major outer face of the graphite, alloy, or oxide-containing negative electrode material layer 14 and the major outer face of the lithium and transition metal-containing positive electrode material layer 18. The porous electrode members 14, 18 and the solid electrolyte-filled, membrane member 20 are respectively infiltrated and surrounded with a non-aqueous liquid, lithium-ion containing electrolyte which enables the transport of lithium ions between the porous electrode members. But the solid electrolyte plugs 24 in the pores 22 of membrane 20 are used to prevent direct electrical contact between the negative and positive electrode material layers 14, 18. Filled or coated membrane 20 is shaped and sized to serve this function. Equally importantly, the solid electrolyte plugs 24 are used to prevent transition metal ions and other SEI-harming species from travelling from the positive electrode material 18 to the negative electrode material 14

In practices of assembling the elements of a lithium-ion cell, the electrode structures and the solid electrolyte—containing member may be formed separately and then combined in the assembly of the cell. In such practices, the opposing major outer faces of the electrode material layers 14, 18 are pressed against the major area faces of the solid electrolyte-coated, porous alumina membrane 20. A liquid electrolyte is injected into the assembly around the solid electrolyte-filled membrane 20 and into the pores of the electrode material layers 14, 18.

The electrolyte for the lithium-ion cell is often a lithium salt dissolved in one or more organic liquid solvents. Examples of salts include lithium hexafluorophosphate ($LiPF_6$), lithium tetrafluoroborate ($LiBF_4$), lithium perchlorate ($LiClO_4$), lithium hexafluoroarsenate ($LiAsF_6$), and lithium trifluoroethanesulfonimide. Some examples of solvents that may be used to dissolve the electrolyte salt include ethylene carbonate, dimethyl carbonate, methylethyl carbonate, and propylene carbonate. There are other suitable lithium salts that may be used, and other solvents. But a combination of lithium salt and non-aqueous liquid solvent is selected for providing suitable mobility and transport of lithium ions between the opposing electrodes in the operation of the cell. The electrolyte is carefully dispersed into and between closely spaced layers of the electrode elements and solid electrolyte/membrane layer. The liquid electrolyte is not illustrated in the FIG. 1 drawing.

Following are examples of solid electrolyte materials that may be used in the preparation of a solid electrolyte containing membrane for use in lithium-ion cells employing a layer of particles of a lithium-intercalatable negative electrode material and a layer of particles of a suitable oxide, phosphate, sulfate, sulfide, or fluoride of lithium and transition metal in the positive electrode.

Examples of Lithium-Containing/Lithium-Ion Conducting Solid Electrolytes

Oxides with the perovskite structure: $Li_{3x}La_{2/3-x}TiO_3$ ($0<x<⅔$), e.g., $Li_{0.5}La_{0.5}TiO_3$.

Oxides with the garnet structure: $Li_{5+x}La_3M_{2-x}Zr_xO_{12}$ (M=Nb, Ta, or mixture thereof, $0 \leq x \leq 2$), e.g., $Li_5La_3Nb_2O_{12}$, $Li_5La_3Ta_2O_{12}$ and $Li_7La_3Zr_2O_{12}$.

NASICON oxides: $Li_{1+x+z}M_x(Ge_{1-y}Ti_y)_{2-x}Si_zP_{3-z}O_{12}$ (M=Al, Ga, or mixture thereof, $0 \leq x \leq 0.8$, $0 \leq y \leq 1.0$, $0 \leq z \leq 0.6$).

LISICON oxides or sulfides: e.g., $Li_{14}ZnGe_4O_{16}$, $Li_3PS_4$, $Li_2ZnGeS_4$.

Thio-LISICON sulfides: $Li_{4-x}M_{1-x}P_xS_4$ (M=Ge, Sn, or mixture thereof, $0 \leq x \leq 1.0$), e.g., $Li_{10}GeP_2S_{12}$, $Li_{10}SnP_2S_{12}$, $Li_3PS_4$.

Sulfides glasses: compounds of following components with various ratios: $Li_2S$—$SiS_2$, $Li_2S$—$SiS_2$—$Li_3PO_4$, $Li_2S$—$SiS_2$—$LiI$, $Li_2S$—$SiS_2$—$LiBr$, $Li_2S$—$SiS_2$—$LiCl$, $Li_2S$—$SiS_2$—$B_2S_3$—$LiI$, $Li_2S$—$SiS_2$—$P_2S_5$—$LiI$, $Li_2S$—$B_2S_3$, $Li_2S$—$P_2S_5$, $Li_2S$—$P_2S_5$—$LiI$, $Li_2S$—$P_2S_5$—$Z_xS_y$, (Z=Ge, Zn, Ga, or mixture thereof), $Li_2S$—$GeS_2$, $Li_2S$—$GeS_2$—$P_2S_5$.

Other ceramics: $Li_{4-x}Sn_{1-x}As_xS_4$ (0≤x≤0.25), lithium phosphorus oxynitride (LIPON, $Li_{3-x}PO_{4-y}N_z$), $Li_3N$, and $Li_3P$.

The following polymers when filled with lithium-containing salts: polyethylene oxide (PEO), PEO-based copolymers including alternating copolymer, block copolymer, or homogeneous blend of at least two polymers including polystyrene, polyester, polypropylene, polyethylene napthalate, polycarbonate, polyphenylene sulfide, polytetrafluoroethylene (PTFE), polyimide, poly(acrylonitrile), poly(methyl methacrylate), and poly(vinylidne fluoride) (PVDF).

These polymers may be filled or doped with various lithium salts, including: lithium hexafluorophosphate $LiPF_6$, lithium perchlorate $LiClO_4$, lithium tetrafluoro-borate $LiBF_4$, lithium hexafluoroarsenate $LiAsF_6$, lithium tetrachloroaluminate $LiAlCl_4$, lithium trifluoromethane sulfonate $LiCF_3SO_3$, lithium bis(trifluoromethane sulfonyl) imide (lithium imide) $LiN(CF_3SO_2)_2$, lithium methide $LiC(SO_2CF_3)_3$, lithium bis(trifluoromethanesulfonyl) imide (LiTFSI) $Li_3N(SO_2CF_3)_2$, lithium bis(fluorosulfonyl)imide (LiFSI) $LiN(SO_2F)_2$, lithium bis(oxalato)borate (LiBOB), $LiB(C_2O_4)_2$, lithium difluoro(oxalato)borate (LiFOB) $LiBF_2C_2O_4$.

Following are examples of methods that may be used to apply lithium-containing solid electrolyte materials onto thin, porous, flexible membranes such as anodized aluminum membranes and lithium-containing ceramic membranes.

The practices of this invention use thin, flexible, and porous ceramic membranes.

The membranes, which are substrates for the solid electrolyte material, are typically ten nanometers to one millimeter in thickness and have one dimensional pores that extend from one side of the membrane to the opposite side. The diameters of the pores are suitably in the range of about one nanometer to about five micrometers. The pores or holes are distributed over substantially the entire sides of the membrane. The collective area of the pore openings is suitably about twenty to ninety five percent of the outline area of the face of the membrane.

The substrates consist of ceramic material with or without Li conducting properties. For example, anodized alumina having one dimensional channels or pores with various nano-sized diameters is used as the substrate. Or a Li-conducting ceramic, such as $Li_{4-x}Sn_{1-x}As_xS_4$ (0≤x≤0.25), may be used.

Methods to Apply Solid Electrolytes on a Porous Ceramic Body

Example 1) Screen Printing Process for Ceramic Solid Electrolytes

Homogeneously blend the selected and prepared ceramic solid electrolyte particles with organic binders (e.g., ethyl cellulose, poly (vinyl alcohol), poly (vinyl butyral), etc.) and a suitable solvent (e.g., alpha terpineol) to prepare a paste. The solid electrolyte layer is formed on a surface of a porous membrane substrate, or into the pores of the substrate, by applying the paste to the substrate using a screen printer, followed by drying and curing at below 200° C. The solid electrolyte coated substrate is co-fired at a desired temperature (200-1100° C.) and in an atmosphere (air, nitrogen, or argon) which depend on the solid electrolyte ceramics.

Example 2) Vapor Deposition Coating Process

Gas phase coating or deposition of solid electrolytes using a variety of techniques including sputtering, plasma spraying, thermal spraying, electrochemical vapor deposition (EVD), chemical vapor deposition (CVD), pulse laser deposition (PLD). Densified pellets of solid electrolytes are used as targets for sputtering and pulse laser deposition processes. Metal-chloride or metal organic compounds (e.g., metal alkoxides) are used as precursors of CVD and EVD. The deposition temperature is controlled to be in a range of 200-1100° C. under various atmospheres, which depends on the selected solid electrolyte ceramic composition.

Example 3) Tape-Casting Process

Prepare electrolyte green tape by mixing electrolyte with binders, plasticizers, and solvents with appropriate ratio to form a suitable slurry. The prepared slurry is spread on a flat surface (a tape surface) with controlled thickness using the doctor blade technique. Thus obtained flexible green tape (with un-fired electrolyte particles) with various thicknesses (thin (~1 μm) to thick (several hundred micrometers) is cut to size, then gently hot-pressed against the surface of the porous substrate body. The resulting tape-applied, green ceramic composite coating of solid electrolyte particles is co-fired at a suitable, desired temperature (200-1100° C.) and in a suitable atmosphere (air, nitrogen, or argon) to sinter and bond the particles into an electrolyte coating that is impervious to the liquid electrolyte.

Example 4) Dip-Coating Process

Solid electrolyte powders are prepared as slurry by mixing them with solvent, plasticizer, surfactant, and binder with predetermined suitable ratios. The homogeneous and stable slurry is obtained by ball-milling, followed by degassing under vacuum. To selectively coat one side of a ceramic porous substrate, the other sides are masked during the dip-coating process. The porous ceramic substrate is dipped into the ceramic slurry and, after a few seconds, it is lifted out. Speeds of dipping in and out are controlled. This dip-coating process is repeated several times to obtain a target thickness of the solid electrolyte. After drying, thus obtained green ceramic composite body is co-fired at desired temperature (200-1100° C.) and in a suitable atmosphere (air, nitrogen, or argon), which depend on the composition of the solid electrolyte ceramic of filled polymer material.

Practices for configuring and using the solid electrolyte-coated membranes are now described.

FIGS. 2(a)-2(e) are enlarged, schematic illustrations of a representation of a cross-section of an alumina membrane 30. A thin, flexible alumina membrane 30 is shown in a vertical position with generally equally-spaced pores 32 extending from one facial surface 34 of the membrane 30 to its opposite surface 36. The alumina membrane 30 may be formed in a desired or predetermined two-dimensional shape. As illustrated in FIG. 1 (membrane member 20), the two-dimensional configuration of the membrane 30 is usually intended to cover facing surfaces of lithium-ion cell electrode members placed against the opposing surfaces 32, 34 of membrane 30 when it has received its deposit of a lithium-ion conducting solid electrolyte. In general, the thickness of the thin, flexible alumina membrane will be in the range of about ten nanometers to about one millimeter. The pores 32 that extend through the thickness of the alumina membrane are schematically illustrated as having equal diameters. In general, the pores 32 are generally formed as round, and of about the same diametric size. The diameters (or characteristic dimensions) of pores 32 is typically in the high nanometer range, approaching about fifty micrometers. Preferably, pores 32 are equally spaced over the surfaces 34 and 36 of the membrane. And preferably, the total area of the openings of the pores 32 at each surface 34, 36 is about twenty to ninety five percent of the total superficial area of the two-dimensional configurations of opposing surfaces 34 and 36 of membrane 30.

Figure 2A:
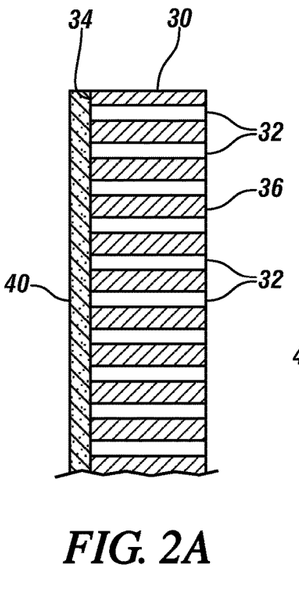

In schematic FIG. 2(a), a thin, generally uniform layer of a lithium-ion conducting solid electrolyte material 40, e.g., about ten nanometers to one millimeter in thickness, has been applied co-extensively with surface 34 of alumina membrane 30. The solid electrolyte material covers the opening of each pore 32 at surface 34 of the membrane 30. As will be illustrated in more detail with respect to FIG. 3 of this specification, it is preferred that the solid electrolyte 40-coated side 34 of membrane 30 be placed against the liquid electrolyte infiltrated material of the lithium and manganese-containing positive electrode of an assembled lithium-ion cell.

Figures 2B, 2C:
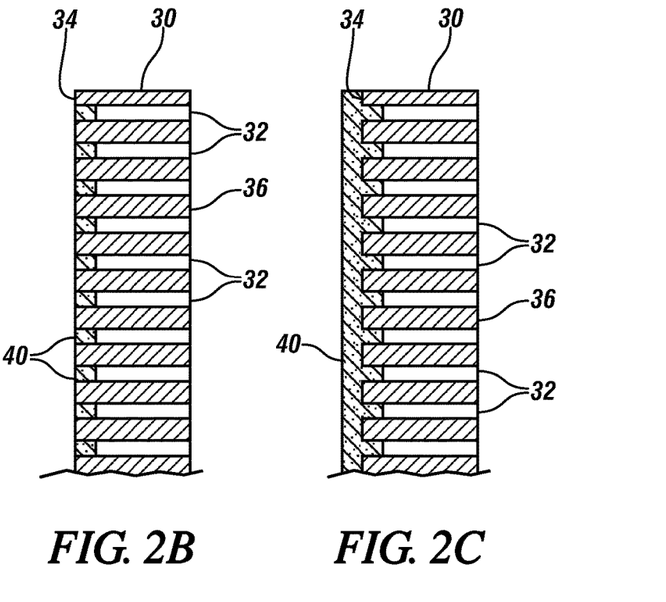

FIG. 2(b) illustrates an embodiment of the invention in which solid electrolyte material 40 has been applied to membrane 30 so as to plug the openings of pores 32 at surface 34. The surface 34 is not intentionally covered, but the openings of the pores at surface 34 are closed.

Figure 2D:
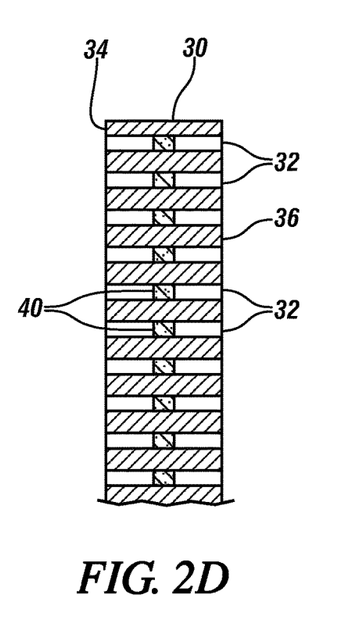
Figure 2E:
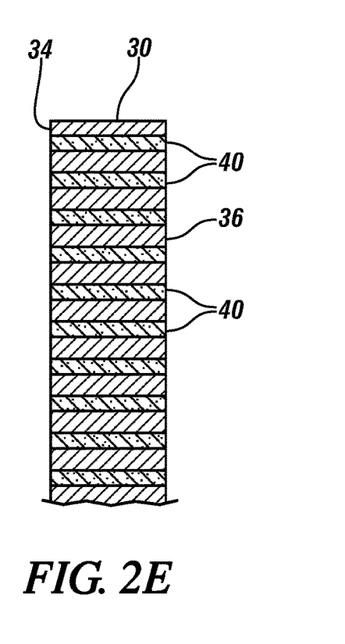

In FIG. 2(c), surface 34 is covered with solid electrolyte 40 and the openings of pores 32 at surface 34 are plugged. In FIG. 2(d), the solid electrolyte 40 has been placed in each of the many pores 32 at a location between surfaces 34 and 36 of alumina membrane 30. And in FIG. 2(e), pores 32 are filled with solid electrolyte substantially along their whole lengths from surface 34 to opposing surface 36 of alumina membrane 30. FIG. 2(e) is like the filled alumina membrane 20 in FIG. 1.

Figure 3:
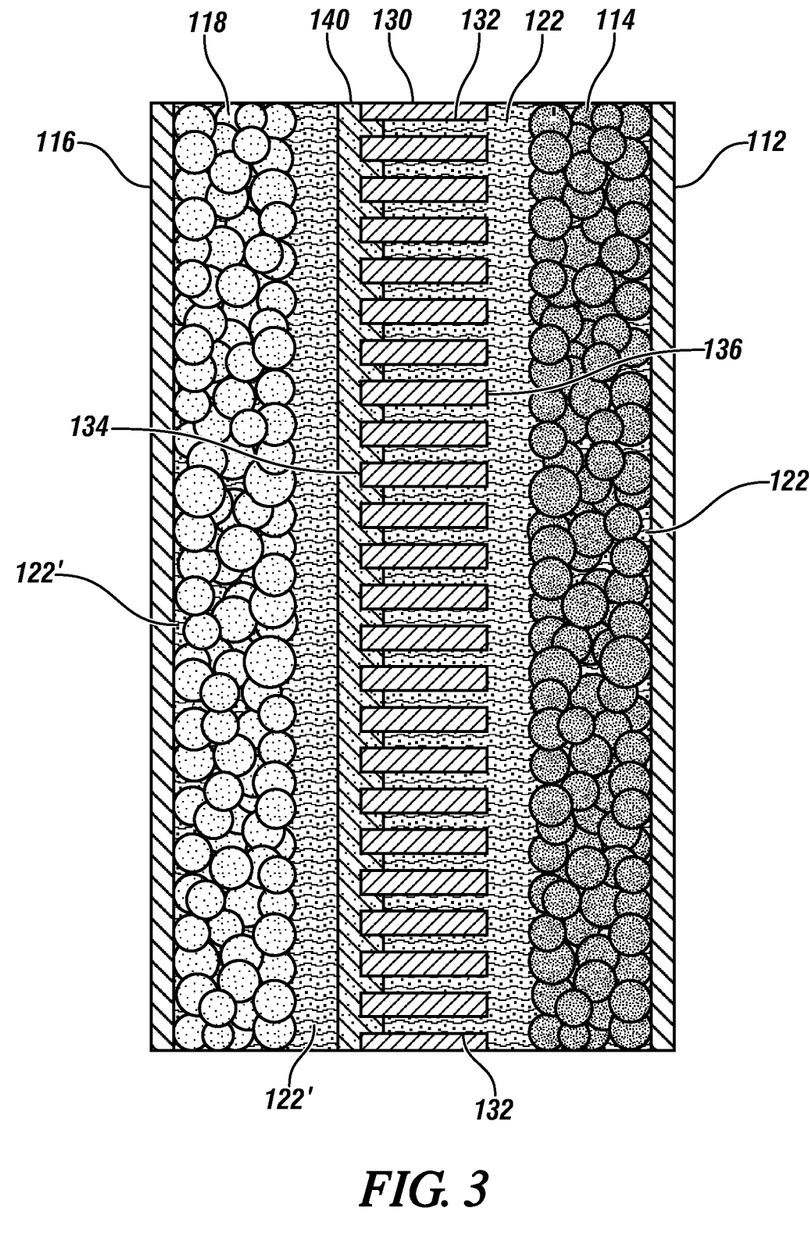
FIG. 3 is an enlarged cross-sectional schematic illustration of a porous positive electrode and porous negative electrode with a coextensive interposed porous alumina membrane with a coating of solid electrolyte material on the positive electrode side of the assembled cell elements (i.e., the manganese ion-containing side of the cell elements). A liquid electrolyte fills the pores of the electrode materials and surrounds the interposed alumina membrane with its coating of solid electrolyte.

FIG. 3 is an enlarged, schematic, illustration of the basic elements of a lithium-ion cell, assembled with a solid electrolyte-coated, thin, flexible membrane in accordance with a preferred embodiment of the invention. A thin porous layer of graphite, alloys, or oxide-containing negative electrode material 114 is bonded to a copper current collector foil 112. For example, a thin porous layer of resin bonded graphite is often preferred. The negative electrode material is either intercalated with lithium (e.g., as $LiC_6$) or converted as lithiated alloys (e.g., $Li_xSi$) and the pores between particles of the negative electrode material are filled with a non-aqueous, lithium-ion containing electrolyte 122, such as $LiPF_6$ dissolved in ethylene carbonate and ethyl methyl carbonate (EMC). In the operation of the cell, a coating of a solid-electrolyte interphase layer (SEI) may be formed on surfaces of the particles of negative electrode material. This layer is not illustrated in FIG. 3.

Shown slightly spaced apart (for purposes of illustration and description) from the surface of the negative electrode material 114 is an alumina or lithium-ion conducting solid membrane 130 with a coating of solid electrolyte material 140 applied to its side 134 and extending into the openings of through-pores 132 located at membrane side 134. One example (from the listing above in this specification) of a suitable solid electrolyte coating material is a NASICON-type oxide, such as $Li_{1+x+y}Ti_{2-x}Al_xP_{3-y}Si_yO_{12}$ ($0 \le x \le 0.8$, $0 \le y \le 0.6$). The pore 132 openings at the opposite side 136 of alumina membrane 130 are open. And, as illustrated, liquid electrolyte 122 from the negative electrode material 114 side of membrane 130 has filed the open portions of each of pores 132.

Positive electrode material 118 bonded to aluminum current collector 116 is placed adjacent the opposite side 134 of alumina membrane 130. Positive electrode material 118, for example, is formed of particles of a lithium-nickel-manganese oxide ($LiNi_{0.5}Mn_{1.5}O_4$) or lithium-nickel-cobalt-manganese oxide, which are bonded in a porous layer to each other and to aluminum current collector 116. A volume of liquid electrolyte 122' fills the pores of positive electrode material 118, but cannot flow around or through the solid electrolyte coating 140 on side 134 of alumina membrane 130. Preferably, but not necessarily, liquid electrolyte 122' is the same composition as liquid electrolyte 122, which permeates the negative electrode material 114. In an assembled lithium-ion cell, the exposed surface of the layer of negative electrode material would lie against the uncoated surface 136 of the alumina membrane 130 and the exposed surface of positive electrode material 118 would lie against the solid electrolyte 140 applied to the surface 134 of the thin flexible membrane 130.

In the operation of the overall cell, during cell discharge, electrons would be released from lithium ions leaving the negative electrode material 114. As stated, the lithium ions leaving the particles of the negative electrode materials (e.g., graphite or other lithium-intercalatable materials) may flow through a SEI layer on the negative electrode material 122. The electrons would flow into current collector 112 and into an external circuit. The released lithium ions are readily transported through the liquid electrolyte 122 (including the portion of liquid electrolyte in the many pores 132), through the nanometer or micrometer thickness of solid electrolyte 140 and into electrolyte 122' associated with the porous positive electrode material 118. The lithium ions leaving the negative electrode material are assimilated into the solid electrode material 114 as electrons concurrently enter the current collector 116 (from the external circuit) and enter the solid electrode material 118, enabling it to assimilate the lithium ions.

During charging of the lithium-ion cell the flow of lithium ions is reversed. As the lithium ions leave the positive electrode material, transition metal ions may also be released, as indicted schematically in FIG. 3. Transition metal ions and other by-products, such as hydrogen fluoride, carboxides, hydrocarbons, carbohydrates, transition metal fluorides, or lithium fluorophosphates (formed from any unwanted reactions between liquid electrolyte and the positive electrode material) may enter the liquid electrolyte 122'. But these by-products of the positive electrode material are blocked by the solid electrolyte coating 140 on the thin, flexible alumina membrane and cannot reach and damage the negative electrode material (or its SEI layer).

It has been demonstrated in a cell using a graphite negative electrode, a $LiNi_{0.5}Mn_{1.5}O_4$ solid electrode, each with a liquid electrolyte, and with an interposed solid electrolyte ($Li_{1+x+y}Ti_{2-x}Al_xP_{3-y}Si_yO_{12}$ type) coated on a thin porous alumina module, that about 90% of the full discharge capacity of the cell was retained for up to 500 hours of repeated cycling. But when the cell was operated with just the liquid electrolyte, the discharge capacity of the cell rapidly decreased.

Thus, the inexpensive and efficient combination of a lithium and transition metal-containing positive electrode material and graphite, or lithium-accepting alloys, or oxides-containing negative electrode material can be maintained in a productive lithium-ion cell.

Practices of the invention have been illustrated by specific examples. But the illustrative examples are not intended to limit the proper scope of the invention.

The invention claimed is:

1. A lithium-ion cell comprising:
a negative electrode comprising a porous layer of particles of a composition into which lithium can be inserted from a lithium-ion containing electrolyte, the porous layer of negative electrode particles having a thickness and a two-dimensional shape with opposing sides, one side of the porous layer of negative electrode particles being bonded to a surface of a current collector, the pores of the layer of negative electrode particles being infiltrated with a non-aqueous liquid, lithium ion-containing electrolyte such that lithium ions are transported through the liquid electrolyte into and out of the negative electrode particles during charging and discharging of the lithium-ion cell;
a positive electrode comprising a porous layer of particles of a compound comprising lithium and a transition metal, the porous layer of the positive electrode compound having a thickness and a two-dimensional shape with opposing sides, the two dimensional shape being coextensive with the two-dimensional shape of the porous layer of negative electrode particles, one side of the porous layer of positive electrode particles being bonded to a surface of a current collector, the pores of the layer of positive electrode compound particles being infiltrated with a non-aqueous liquid, lithium ion-containing electrolyte such that lithium ions and transition metal ions are transported into the liquid electrolyte during discharging and charging of the lithium-ion cell;
a flexible membrane formed of a lithium-containing ceramic composition and having a thickness and a two dimensional shape with opposing sides, the membrane having individual transverse pores extending from one side of the membrane to the other side, the two dimensional shape of the membrane being coextensive with the second side of each of the negative electrode and the positive electrode, the membrane having a coating of a solid electrolyte composition that permits the passage of lithium ions from one side of the porous membrane through the pores of the membrane to the other side of the membrane, but does not permit the passage of transition metal ions through the solid electrolyte, wherein the coating of the solid electrolyte composition comprises one of (1) an oxide of lithium and at least one other metal, (2) a sulfide of lithium and a sulfide of silicon, and (3) a carbon-based polymer filled with particles of lithium salt; and
the second side of the negative electrode being placed against one side of the porous membrane and the second side of the positive electrode being placed against the other side of the porous membrane, such that, in the operation of the lithium-ion cell, transition metal ions are not permitted to flow through the solid electrolyte and through the pores of the membrane to reach the negative electrode particles in the negative electrode.

2. A lithium-ion cell as stated in claim 1 in which the negative electrode material comprises one or more of graphite, a mixture of graphite and silicon, $TiO_2$, and $Li_4Ti_5O_{12}$.

3. A lithium-ion cell as stated in claim 1 in which the negative electrode material comprises a mixture or alloy of one or more of Sn, Si, $SiO_2$, Cr, Mn, Fe, Co, Ni, and Cu.

4. A lithium-ion cell as stated in claim 1 in which the positive electrode material comprises a porous layer of particles of an oxide, phosphate, sulfate, sulfide, or fluoride compound that comprises lithium, a transition metal element, and at least one other element.

5. A lithium-ion cell as stated in claim 1 in which the positive electrode material comprises an oxide of lithium, nickel, and manganese or a combination of oxides of lithium, cobalt, nickel, and manganese.

6. A lithium-ion cell as stated in claim 1 in which the positive electrode material comprises at least one of (i) $Li_{1+x}Ni_yCo_zMn_{1-x-y-z}O_2$ where x, y, and z have values such that the ratios of Ni—Co—Mn are one of 1-1-1, ⅓-⅓-⅓, 5-3-2, 6-2-2, 8-1-1, and 9-½-½, (ii) $LiNi_{0.5}Mn_{1.5}O_4$, and (iii) $LiNi_{1-x}M_xO_2$, where $0 \leq x \leq 0.5$ and M is one or more of Al, Ti, Cr, Mn, Fe, Co, Cu, Zn, Mn.

7. A lithium-ion cell as stated in claim 1 in which a coating of the solid electrolyte is applied to one surface of the flexible membrane such that it covers all of the pore openings on that side of the membrane, and the second side of the positive electrode is placed against the coating of the solid electrolyte.

8. A lithium-ion cell as stated in claim 1 in which the each of the pores of the membrane are closed to the flow of the liquid electrolyte by a deposit of solid electrolyte material within the pores of the membrane.

9. A lithium-ion cell as stated in claim 1 in which the membrane has a uniform thickness in the range of ten nanometers to one millimeter and the pores have diameters up to fifty micrometers and the pores are distributed generally uniformly over the sides of the membrane.

10. A lithium-ion cell as stated in claim 9 in which the total area of the pore openings is about 20% to 95% of the apparent area of the two-dimensional shape of the membrane.

11. A lithium-ion cell as stated in claim 1 in which the coating of the solid electrolyte comprises the oxide of lithium and at least one other metal, the other metal being selected from the group consisting of lanthanum, titanium, zirconium, niobium, tantalum, germanium, aluminum, and gallium.

12. A lithium-ion cell as stated in claim 11 in which the coating of the solid electrolyte comprises an oxide of lithium, and at least one other metal, and one or more of phosphorus, silicon, and sodium.

13. A lithium-ion cell as stated in claim 1 in which the lithium salt is selected from the group consisting of lithium hexafluorophosphate LiPF6, lithium perchlorate LiClO4, lithium tetrafluoro-borate LiBF4, lithium hexafluoroarsenate LiAsF6, lithium tetrachloroaluminate LiAlCU, lithium trifluoromethane sulfonate LiCF3SO3, lithium bis(trifluoromethane sulfonyl) imide (lithium imide) LiN(CF3SO2)2, lithium methide LiC(SO2CF3)3, lithium bis(trifluoromethanesulfonyl) imide (LiTFSI) Li3N(SO2CF3)2, lithium bis (fluorosulfonyl) imide (LiFSI) LiN(SO2F)2, lithium bis (oxalato) borate (LiBOB), LiB(C2O4)2, lithium difluoro (oxalato) borate (LiFOB) LiBF2C2O4.

14. A lithium-ion cell as stated in claim 1 in which the carbon-based polymer is selected from the group consisting of polyethylene oxide (PEO), PEO-based copolymers including alternating copolymer, block copolymer, or a homogeneous blend of at least two polymers including polystyrene, polyester, polypropylene, polyethylene naptha-late, polycarbonate, polyphenylene sulfide, polytetrafluoro-ethylene (PTFE), polyimide, poly(acrylonitrile), poly(methyl methacrylate), and poly(vinylidene fluoride) (PVDF).

15. A lithium-ion cell comprising:

a negative electrode comprising a porous layer of particles of a composition comprising one or more of graphite, a lithium-accepting mixture of graphite with another element, and a lithium-accepting oxide of titanium or of titanium and lithium, the porous layer of negative electrode particles having a thickness and a two-dimensional shape with opposing sides, one side of the porous layer of negative electrode particles being bonded to a surface of a current collector, the pores of the layer of negative electrode particles being infiltrated with a non-aqueous liquid, lithium ion-containing electrolyte such that lithium ions are transported through the liquid electrolyte into and out of the negative electrode particles during charging and discharging of the lithium-ion cell;

a positive electrode comprising a porous layer of particles of an oxide or phosphate compound of lithium and a transition metal, the porous layer of the positive electrode compound having a thickness and a two-dimensional shape with opposing sides, the two dimensional shape being co-extensive with the two-dimensional shape of the porous layer of negative electrode particles, one side of the porous layer of positive electrode particles being bonded to a surface of a current collector, the pores of the layer of positive electrode compound particles being infiltrated with a non-aqueous liquid, lithium ion-containing electrolyte such that lithium ions and transition metal ions are transported into the liquid electrolyte during discharging and charging of the lithium-ion cell;

a flexible membrane formed of a lithium-containing ceramic composition and having a thickness and a two dimensional shape with opposing sides, the membrane having individual transverse pores extending from one side of the membrane to the other side, the two dimensional shape of the membrane being coextensive with the second side of each of the negative electrode and the second face of the positive electrode, the membrane having a coating of a solid electrolyte composition that permits the passage of lithium ions from one side of the porous membrane through the pores of the membrane to the other side of the membrane, but does not permit the passage of transition metal ions through the solid electrolyte, wherein the coating of the solid electrolyte composition comprises one of (1) an oxide of lithium and at least one other metal, (2) a sulfide of lithium and a sulfide of silicon, and (3) a carbon-based polymer filled with particles of lithium salt; and the second side of the negative electrode being placed against one side of the porous membrane and the second side of the positive electrode being placed against the other side of the porous membrane, such that, in the operation of the lithium-ion cell, transition metal ions are not permitted to flow through the solid electrolyte and through the pores of the membrane to reach the negative electrode particles in the negative electrode.

* * * * *